United States Patent [19]

Yamada et al.

[11] Patent Number: 5,649,314
[45] Date of Patent: Jul. 15, 1997

[54] SELECTIVE RADIO PAGING RECEIVER WITH BATTERY SAVING OPERATION

[75] Inventors: Kazumori Yamada, Shizuoka; Masahiro Matai, Tokyo, both of Japan

[73] Assignee: NEC Corporation, Japan

[21] Appl. No.: 421,068

[22] Filed: Apr. 13, 1995

[30] Foreign Application Priority Data

Apr. 13, 1994 [JP] Japan .................... 6-073681

[51] Int. Cl.⁶ ........................................ H04B 1/10
[52] U.S. Cl. ................ 455/343; 455/38.3; 455/258
[58] Field of Search ..................... 455/38.3, 343, 455/258, 259, 265; 340/825.94; 331/185, 186, 158

[56] References Cited

U.S. PATENT DOCUMENTS

| | | | |
|---|---|---|---|
| 4,328,571 | 5/1982 | Noble | 368/87 |
| 4,384,361 | 5/1983 | Masaki | 455/343 |
| 4,422,178 | 12/1983 | Mori | 455/343 |
| 4,479,261 | 10/1984 | Oda et al. | 340/825.44 |
| 4,506,386 | 3/1985 | Ichikawa et al. | 455/38.3 |
| 5,193,212 | 3/1993 | Son | 455/38.3 |
| 5,208,558 | 5/1993 | Shigehara et al. | 331/158 |

FOREIGN PATENT DOCUMENTS

| | | |
|---|---|---|
| 58-182332 | 10/1983 | Japan . |
| 61-92050 | 5/1986 | Japan . |
| 2-58936 | 2/1990 | Japan . |
| 3-248635 | 11/1991 | Japan . |
| 4-342320 | 11/1992 | Japan . |

*Primary Examiner*—Edward F. Urban
*Assistant Examiner*—Darnell Armstrong
*Attorney, Agent, or Firm*—Ostrolenk, Faber, Gerb & Soffen, LLP

[57] ABSTRACT

In a selective radio paging receiver, power supply for a local oscillator portion which has the longest period to take up to normal operation from on-set of power supply is performed with an elevated voltage higher than the battery voltage in the normal operation to shorten the take-up period. Subsequently, the battery voltage is supplied to the local oscillator portion together with the radio reception portion, wave shaper circuit and so forth. Therefore, power supply for the radio reception portion and the wave shaper circuit can be delayed to shorten the overall power supply period to improve battery saving effect.

10 Claims, 4 Drawing Sheets

SELECTIVE RADIO PAGING RECEIVER WITH BATTERY SAVING OPERATION

BACKGROUND OF THE INVENTION

1. Field of the Invention

The present invention relates generally to a radio paging receiver. More specifically, the invention relates to a battery saving function for reducing power consumption in a radio paging receiver.

2. Description of the Related Art

A radio paging receiver receives a radio paging signal from a base station of a paging system, by means of an antenna. After amplification of the radio paging signal at a radio reception portion, the radio paging signal is subject to frequency mixing with a local oscillation signal from a local oscillator portion employing a quartz oscillator as a source oscillator to obtain a low frequency signal. The low frequency signal is binary-coded by a wave shaper circuit and thus converted into a digital signal. The paging signal containing the digital signal is compared with its own paging number stored in a ROM by a decoder. When a match is established, the decoder drives a ring drive circuit by a paging notice signal to generate a ring sound through a speaker to notice the user of reception of a page.

When a display message is transmitted following to the foregoing paging signal, the decoder drives a display driver portion for displaying the message on a display portion after decoding the message. This type of selective radio paging receiver permits checking of the received message by depression of a reset switch.

Such a selective radio paging receiver employs a battery as a primary power source. Also, it is possible to produce a secondary power source from the battery to provide a power supply to the foregoing circuit from the primary and secondary power sources, if required. Accordingly, in this type of selective radio paging receiver, for expanding the life of the battery for convenience of the user, it is necessary to conserve the battery supply by reducing power consumption.

Most of the battery conservation found in conventional radio paging receivers supplies power at a predetermined voltage for the radio reception portion, including local oscillator portion, wave shaper circuit and so forth, which consume large power, intermittently (e.g. Japanese Unexamined Patent Publications (Kokai) Nos. Showa 61-92050 and Showa 58-182332). Also, another type of battery conservation is to lower an operation voltage in a specific circuit except for normal operation state to reduce power consumption (e.g. Japanese Unexamined Patent Publications Nos. Heisei 4-342320, Heisei 3-248635, Heisei 2-58936).

The conventional selective radio paging receiver set forth above intermittently supplies power to the circuit consuming large amounts of power, such as radio reception portion including the local oscillator, wave shaper circuit and so forth, or supplies lowered supply voltage except for normal operation state. In such case, the timing of battery saving operation has to be determined with taking resume period required to resume normal oscillating condition of the quartz oscillator in the local oscillator, into account. However, in the conventional receiver, battery saving operation is performed at the timing adapted to the rise period of the local oscillator even for the radio reception portion, wave shaper circuit and so forth, which are quick in resumption of normal operation. As a result, power consumption can not be reduced satisfactorily.

Also, since the quartz oscillator requires longer period to resume normal oscillation under low temperature environment, the selective radio paging receiver is required to set further long period of power supply for the local oscillator portion to further degrade effect of battery saving. It should be appreciated that the period required to resume normal operation of the quartz oscillator becomes longer at lower operation voltage. Therefore, when the operation voltage is low, the required period becomes further longer.

SUMMARY OF THE INVENTION

It is an object of the present invention to provide a selective radio paging receiver which can enhance effect of a battery saving operation.

According to the first aspect of the invention, a selective radio paging receiver comprises:

local oscillation means for generating a local oscillation signal;

frequency conversion means for mixing a radio paging signal and the local oscillation signal to convert the radio paging signal into a low frequency signal;

wave shaper means for binary-coding the low frequency signal and thus converting into a digital signal;

power supply timing signal generating means for regularly generating a power supply timing signal defining a battery saving period;

battery saving means for terminating power supply at least for the local oscillation means, the frequency conversion means and the wave-shaper means during the battery saving period defined by the power supply timing signal, the battery saving means including:

first power supply circuit responsive to occurrence of the power supply timing signal to supply a predetermined first voltage to the local oscillation means for a given period; and second power supply circuit for supplying a power of a second voltage lower than the first voltage to the local oscillation means for a period from expiration of the given period to termination of the power supply timing signal.

According to the second aspect of the invention, a selective radio paging receiver comprises:

radio reception portion for generating a low frequency signal by frequency mixing a radio paging signal and a local oscillation signal;

local oscillation portion for generating the local oscillation signal;

wave shaper circuit for generating a digital signal by binary-coding the low frequency signal;

paging notifying portion responsive to a paging notification signal for notifying paging;

decoder regularly generating a power supply timing signal defining a battery saving period and generating the paging notification signal when a paging signal contained in the digital signal matches with own paging number;

battery saving means for interrupting power supply at least for the radio reception portion, the local oscillation portion and the wave shaper circuit during battery saving period, the battery saving means including:

first power supply circuit initiating supply of a power of a first voltage to the local oscillation portion after a first given period from initiation of reception of the power supply timing signal; and second power supply circuit supplying a power of a second voltage lower than the first voltage to the local oscillation portion in place of the power of the first voltage after expiration of a second given period from initiation of power supply to the local oscillation portion.

According to the third aspect of the invention, a selective radio paging receiver comprises:

radio reception portion for generating a low frequency signal by frequency mixing a radio paging signal and a local oscillation signal;

local oscillation portion for generating the local oscillation signal;

wave shaper circuit for generating a digital signal by binary-coding the low frequency signal;

paging notifying portion responsive to a paging notification signal for notifying paging;

decoder regularly generating a power supply timing signal defining a battery saving period and generating the paging notification signal when a paging signal contained in the digital signal matches with own paging number;

booster circuit for generating a first voltage from a battery voltage;

voltage regulator circuit for generating a second voltage which is lower than the first voltage and stabilized;

first power control means responsive to the power supply timing signal for initiating supply of the power from the booster circuit to the local oscillation portion after a first given period from initiation of reception of the power supply timing signal; and second power control means responsive to the power supply timing signal for initiating supply of power from the voltage regulator circuit in place of the power from the booster circuit after expiration of a second given period from initiation of power supply from the booster circuit.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE EMBODIMENT

The present invention will be discussed hereinafter with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
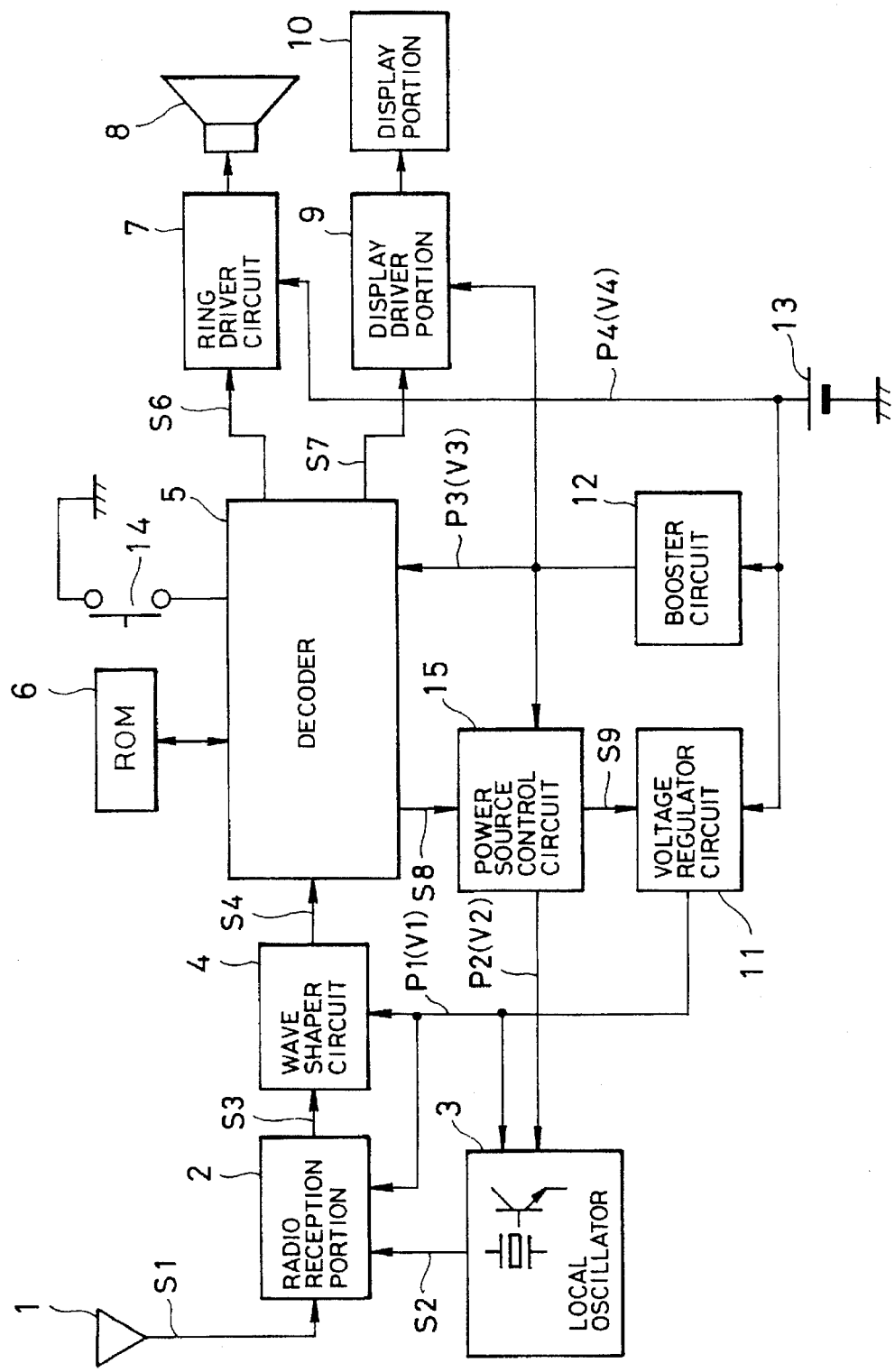
FIG. 1 is a block diagram of the first embodiment of a radio paging receiver according to the present invention.

FIG. 1 is a block diagram of the first embodiment of a radio paging receiver. The radio paging receiver is a single super heterodyne type receiver. From a base station (not shown), a VHF band or UHF band radio paging signal S1 is transmitted. In the shown embodiment, 280 MHz band radio paging signal is employed. The radio paging signal is received by an antenna 1. A radio reception portion 2 amplifies the radio paging signal. Then, the amplified radio paging signal is subjected to frequency mixing with a local oscillation signal S2 of a local oscillating portion 3 to obtain a low frequency signal S3 of 455 KHz, which is an intermediate radio wave frequency.

Here, as an example corresponding to the above, the local oscillator portion 3 can be a Colpitts type quartz oscillator, oscillation at 70 MHz or so forth to obtain the local oscillation signal S2 at the 280 MHz band by multiplying the 70 MHz oscillation signal by 4. The quartz oscillator employs a transistor as an active element.

The lower frequency signal S3 is a binary-coded by a wave shaper circuit 4 and thus converted into a digital signal. The paging signal including the digital signal is compared with an own paging number stored in ROM 6 by a decoder 5. When matching is established, the decoder 5 drives a ring driver circuit 7 by a paging notice signal S6. The ring driver circuit 7 causes ring sound in the speaker 8 to notice reception of paging to the user. The decoder 5 also transmits a power supply timing signal S8 defining a battery saving period.

When a display message is transmitted following to the foregoing paging signal, the decoder 5 drives a display driver portion 9 for displaying the message on a display portion 10 by feeding a display drive signal S7 after decoding the message. This type of selective radio paging receiver permits to check the received message by depression of a reset switch 14.

The selective radio paging receiver has a battery 13 as a primary power source for generating a battery power P4 at a battery voltage V4, and a voltage regulator circuit 11 and a booster circuit 12, which serve in combination as a secondary power source, with receiving supply of the battery power P4 from the battery 13. The selective radio paging receiver is responsive to the power supply timing signal S8 to control the operation period of the voltage regulator circuit 11 and the power supply period of the booster circuit 12. Namely, the selective radio paging receiver includes a power source control circuit 15 for controlling the battery saving operation.

As the battery 13, manganese battery, alkaline battery and so forth can be employed. The battery voltage V4 is approximately 1.7 V in the brand-new state and is gradually lowered down to a critical voltage of approximately 1.0 V, down to which the receiver operates normally, by exhausting according to power consumption. When the battery voltage V4 is lowered to the critical voltage, e.g. approximately 1 V, a low battery alarm of the selective radio paging receiver becomes active. The battery 13 also supplies power to a ring drive circuit 7 in addition to the voltage regulator circuit 11 and the booster circuit 12.

The voltage regulator circuit 11 stably supplies a constant voltage power P1 at a constant voltage V1 to the radio reception portion 2, the local oscillator portion 3 and wave shaper circuit 4 which consumes the largest power among various components of the receiver, only in a period while an enabling signal S9 is received from the power supply control circuit 15.

The voltage regulator circuit 11 compares an output constant voltage V1 and a reference voltage generated by a built-in reference voltage circuit to lower the voltage by means of a control transistor to maintain the output battery voltage at the constant voltage V1. Since the characteristics of the radio reception portion 2, the local oscillator portion 3 and the wave shaper circuit 4 can be significantly differentiated depending upon the power source voltage and can cause abnormal operation, such as failure in sensitivity and so forth, it is necessary to stably apply constant voltage 1≈1.0 V.

It should be noted that the voltage regulator circuit 11 may be provided with a temperature compensation circuit for correcting the constant voltage V1 in order to stabilize operation of the radio reception portion 2 with respect to variation of the environmental temperature condition.

The booster circuit 12 is generally referred to as DC/DC converter and can be of charge pump construction or switching regulator construction. The booster circuit 12 elevates the battery voltage V4 to an elevated voltage of approximately 3 V. A boosted power P3 is supplied to the decoder 5, the display drive portion 9 and the power source control circuit 15.

The power source control circuit 15 is responsive to the power supply timing signal S8 from the decoder 5, initiates supply of a boosted power P2 at an elevated voltage V2 equal to the elevated voltage V3 of the boosted power P3 from the booster circuit 12, to the local oscillator portion 3 after a first predetermined period from starting reception. Then, the power source control circuit 15 terminates supply of the boosted power P2 for the local oscillator 3 after expiration of a second predetermined period from initiation of supply of the boosted power P2 to the local oscillator portion 3. In conjunction therewith, the power source control circuit 15 outputs the enabling signal S9 to make the voltage regulator circuit 11 to output the constant voltage power P1 to the local oscillator portion 3.

Figure 2:
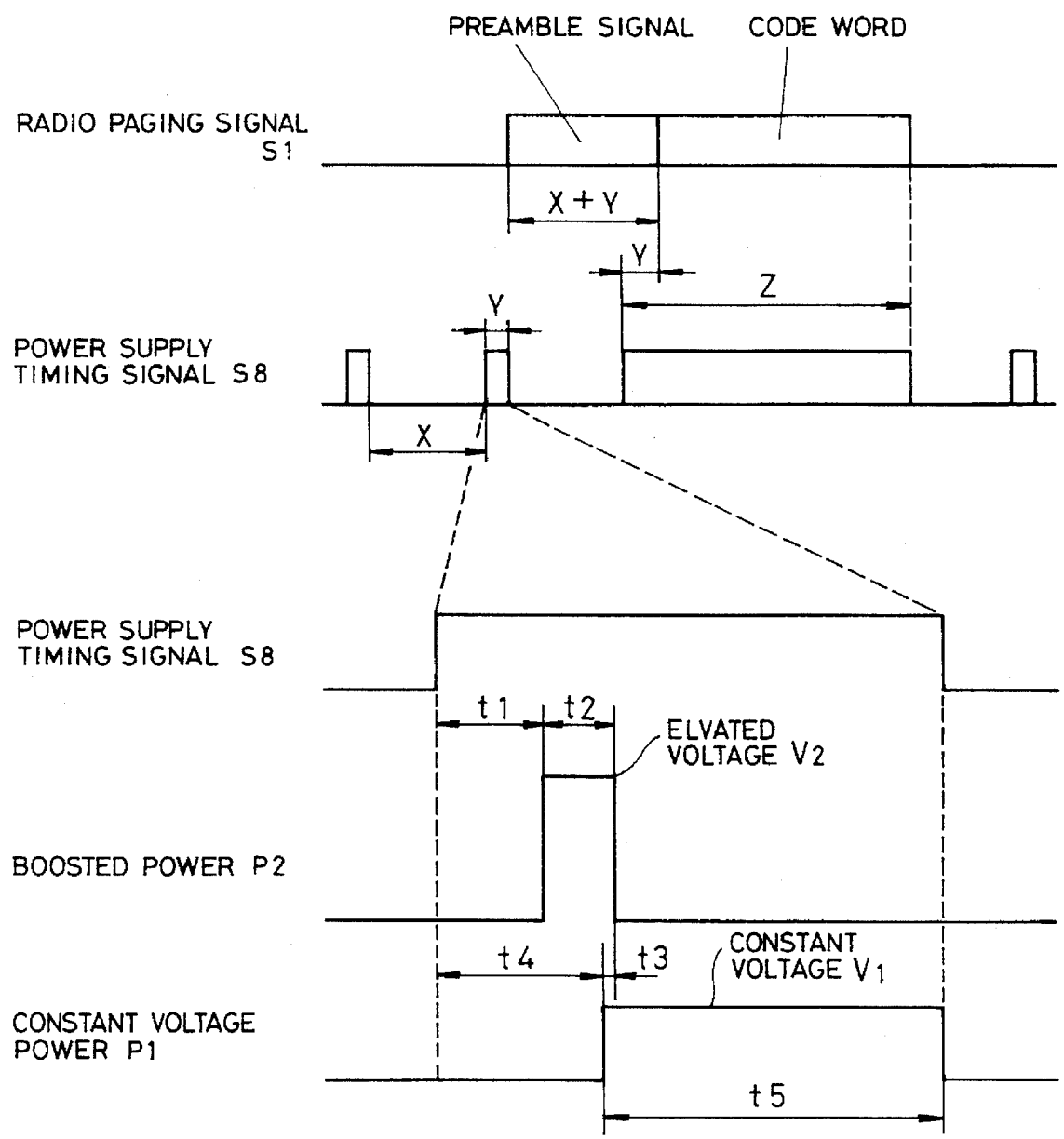
FIG. 2 is an illustration showing operation timing of battery conservation in the first embodiment of the radio paging receiver.

When the power supply timing signal S8 from the decoder 5 is terminated, the power source control circuit 15 also terminates outputting of the enabling signal S9. Thus, the selective radio paging system becomes the battery saving state. FIG. 2 is an explanatory illustration for discussion of a timing for initiating the battery saving operation in the foregoing first embodiment. Referring to FIGS. 1 and 2, the power source timing signal S8 of the selective radio paging receiver is defined according to REC584 determined by the International Radio Consultive Committee (CCIR) and set by a POCSAG code (Post Office Code Standardization Advisory Group).

On the other hand, at the leading end of the selective radio paging signal S1, a preamble signal is inherently added for pull-in synchronization of the receiver. The preamble signal is 576 bits. Therefore, when the signal processing speed of the receiver is 512 bps, the preamble signal period becomes 1.125 seconds; when the signal processing speed of the receiver is 1,200 bps, the preamble signal period becomes 0.48 seconds. A code word including synchronization signal follows the preamble signal.

It should be appreciated that when the radio paging receiver is operative in other paging systems the power supply timing signal S8 should be defined in accordance with the corresponding standard.

Now, assuming that a feed interval of the power supply timing signal S8 from the decoder 5 during battery saving control is X and a period to maintaining the power supply timing signal, namely the period to maintain power supply for the radio reception portion 2, the local oscillator portion 3 and the wave shaper circuit 4 is Y, the period to maintain the preamble period becomes X+Y. Accordingly, the period to maintain the preamble signal and the period to maintaining the power supply timing signal S8 inherently overlap.

When both signals overlap, the decoder 5 continuously outputs the power supply timing signal S8 to release the battery saving operation (period Z). Then, the voltage regulator circuit 11 continuously supplies the constant voltage power P1 to the radio reception portion 2, the local oscillator portion 3 and the wave shaper circuit 4. Thus, the receiver can receive the code word of the radio paging signal to notify paging. On the other hand, as long as the power source timing signal S8 and the preamble signal do not overlap, the receiver maintains the battery saving operation.

Figure 3:
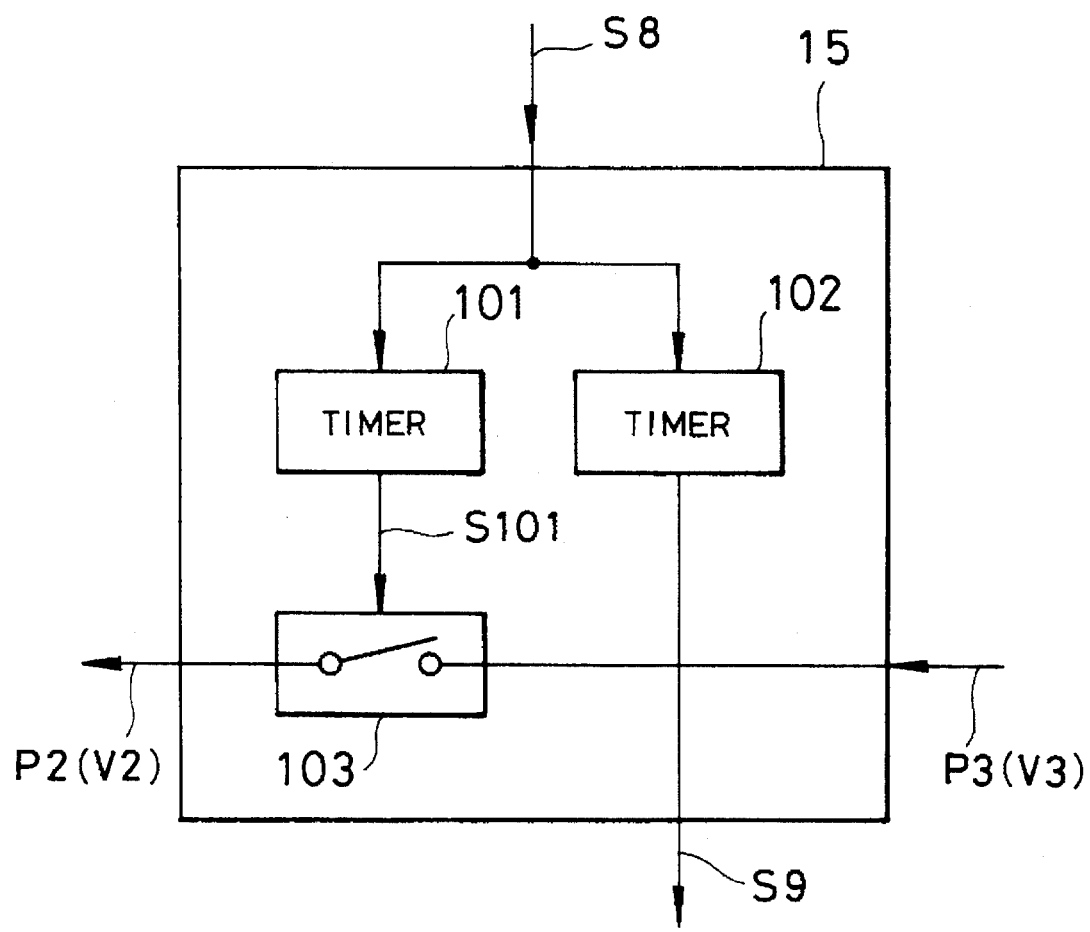
FIG. 3 is a block diagram of a power source control circuit employed in the first embodiment of the radio paging receiver.

FIG. 3 is a block diagram of the power source control circuit 15 to be employed in the first embodiment. Each of timers 101 and 102 of the power source control circuit 15 is constructed with a counter circuit and a switching circuit. When the power supply timing signal S8 is input from the decoder 5, the counter circuit initiates operation for counting down. When counter circuit completes counting, the switching circuit turns on. Namely, timer 101 and 102 output respective of the power supply timing signal S8 held being blocked as on signal S101 and the enabling signal S9.

The on signal S101 turns a switching circuit 103 on to enable supply of the boosted power P3 supplied to the power source control circuit 15 to the local oscillator portion 3. These operation is repeated at every occurrence of input of the power supply timing signal S8.

It should be noted that, as the switching circuit 103, a transistor switching circuit can be employed. In such case, depending upon presence and absence of an external signal, i.e. the on signal S101, the power source is switched between on and off to switch the boosted power P3 between on and off.

Next, the battery saving operation in the foregoing first embodiment will be discussed in detail with reference to FIGS. 1, 2 and 3. When the power source control circuit 15 receives the power supply timing signal S8 from the decoder 5, the timers 101 and 102 initiate counting. The timer 101 outputs on signal S101 to the switching circuit 103 for about the second predetermined period t2 when the first predetermined period t1 from initiation of reception of the power supply timing signal S8 is elapsed. It should be noted that the timer 101 maintains off state even when the power supply timing signal S8 is continuously input after expiration of the first predetermined period. The timer 101 restart counting when the power supply timing signal is once terminated and input again.

The switching circuit 103 is maintained in on state for the t2 period in response to the on signal S101. During this on period, the boosted power P3 from the booster circuit 12 is supplied to the local oscillator portion 3 as the boosted power P2.

Since the local oscillator 3 employs the quartz oscillator which is a mechanically operating circuit, as source oscillator, it is not possible to output normal local oscillation signal S2 instantly in response to the power supply. However, a loop gain of the oscillation circuit in such quartz oscillator becomes higher at higher power source voltage, the time required to reach the normal operation of such quartz oscillator can be shortened by applying a high power source voltage. FIG. 2 is an example, in which the normal operation is reached at a shorter period in the extend of t1 when the power source voltage is V2 which is higher than the power source voltage V1 in the normal operation.

Also, the timer 102 feeds the enabling signal S9 to the voltage regulator circuit 11 for t5 seconds after expiration of a time of t4 seconds from initiation of reception of the power supply timing signal S8, which t4 seconds is shorter than (t1 seconds+t2 seconds) in the extent of t3 seconds.

It should be appreciated that the period of t5 seconds is determined by a period from initiation of reception of the power supply timing signal S8. When the power supply timing signal S8 turns off, the enabling signal output from the timer 102 turns off. When the power supply timing signal S8 is inputted again, the timer 102 restarts counting. It should be noted that the period (t1+t2−t3+t5) is the same as the foregoing period Y.

The voltage regulator circuit 11 becomes active in response to the power supply timing signal S9 to supply the constant voltage power P1 to the radio reception portion 2, the local oscillation portion 3 and the wave shaper circuit 4 for t5 seconds. Here, the timer 102 feeds the enabling signal S9 to the voltage regulator circuit 11 after t4 seconds shorter than the period to terminate supply of the boosted power P2 for the local oscillator 3 in the extent of the compensation time of t3 seconds.

The compensation period of t3 seconds is a time required for switching power supply for the local oscillator 3 from the boosted power P2 to the constant voltage power P1. Namely, the compensation time of t3 seconds is a time set taking into account a necessary time for rising the voltage of the voltage regulator circuit 11 to the rated voltage V1.

It should be appreciated that while the boosted power P2 and the constant voltage power P1 are supplied to the local oscillator portion 3 in parallel during the compensation period t3, no problem will arise since the time t3 is shorted to be less than or equal to 1 msec. and the charge voltage may not become excessively high even when both supply voltages interfere to each other.

Next, discussion will be given for magnitude of improvement in battery saving to be achieved by the shown embodiment. The period Y to maintain the power supply timing signal S8 during battery saving control is set at 97.5 msec., when the signal processing speed is 512 bps. On the other hand, the supply period t5 of the constant voltage power P1 to the radio reception portion 2 and the wave shaper circuit 4 may be 72.5 msec. However, in the conventional receiver, due to delay of taking up of the local oscillator portion 3 and dependency of the take up period on the environmental temperature, the supply period of the constant voltage power becomes 97.5 msec. by providing margin of 25 msec. in the period Y. At this time, the take-up period of the local oscillator portion 3 is 15 msec. in the worst case when the power source voltage V1 is 1.0 V.

On the other hand, the take-up period of the local oscillator 3 is shortened by rising the elevated voltage V2. When the elevated voltage V2=3 V is applied as the power source voltage, the take-up period can be shortened to be approximately half of the foregoing period. The power consumption of the local oscillator 3 during this period (the period t2) becomes about double. However, even with taking the increasing of the power consumption during the t2 period, the shown embodiment of the selective radio paging receiver can achieve reduction of power consumption for about 10% per every occurrence of the power supply timing signal S8.

Figure 4:
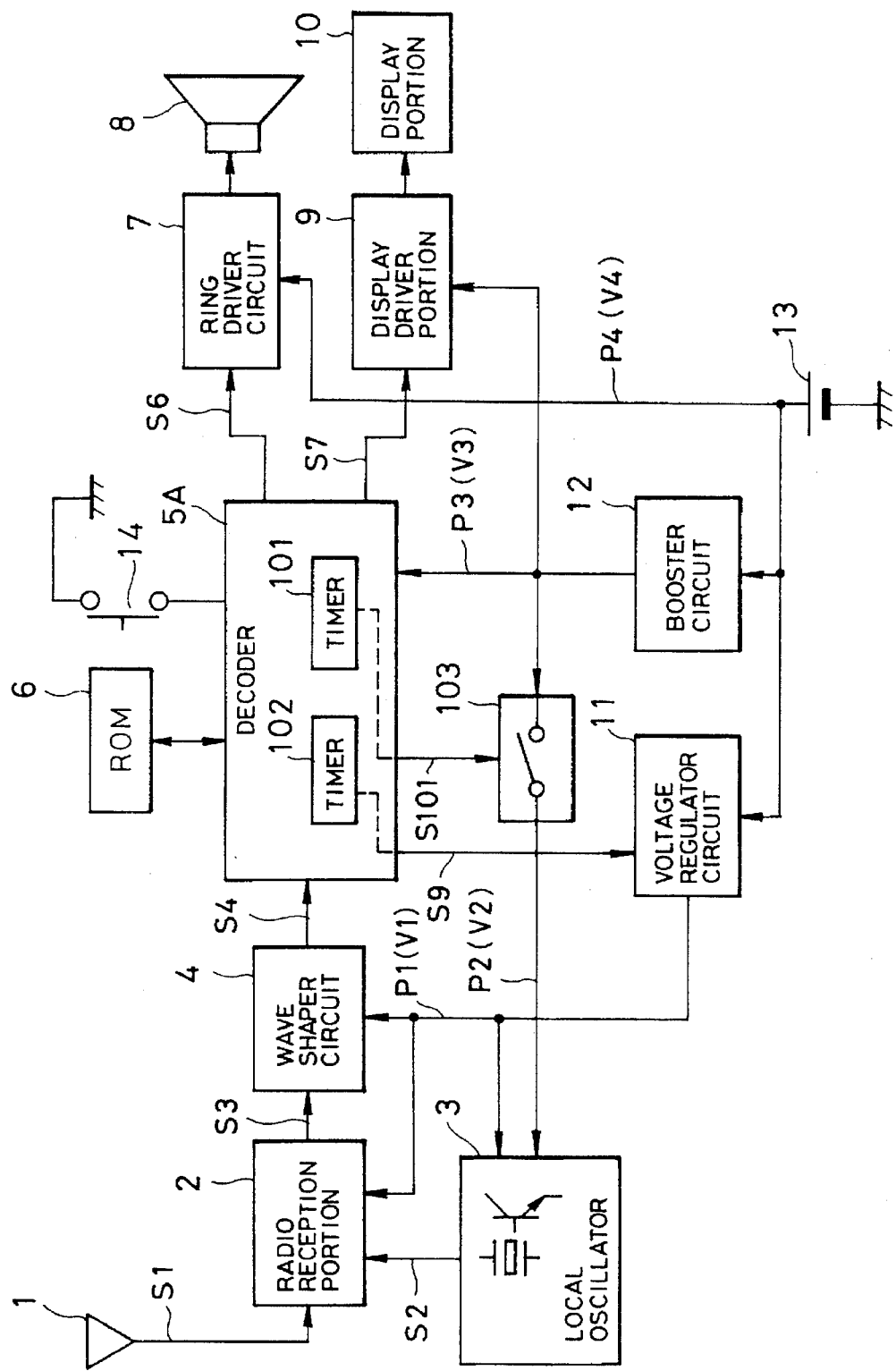
FIG. 4 is a block diagram of the second embodiment of the radio paging receiver according to the present invention.

FIG. 4 shows a block diagram of the second embodiment of the selective radio paging receiver according to the invention. The shown selective radio paging receiver has almost the same construction to the foregoing first embodiment. However, the decoder 5A incorporates the timers 101 and 102 which are included in the power source control circuit 15 in the first embodiment. Also, the switching circuit 103 is provided independently. Similarly to the first embodiment, the timer 101 feeds the on signal S101 to the switching circuit 103. The timer 102 feeds the enabling signal S9 to the voltage regulator circuit 11. Accordingly, even in the shown selective radio paging receiver, the comparable battery saving effect to the foregoing first embodiment can be expected. Since the shown construction of the selective radio paging receiver can use the internal circuit of the decoder 5 for major part of functions by the timers 101 and 102, the simplified switching circuit 103 may be employed.

As set forth, according to the present invention, power supply for the local oscillator portion which takes the longest period from on-set of power supply to reach the normal operation is performed by shortening the take-up period by initially supplying the elevated voltage higher than the battery voltage in the normal operation for a short period, and subsequently supplying the battery voltage simultaneously with other components, i.e. the radio reception portion and the wave shaper portion. Therefore, the power supply to the radio reception portion and the wave shaper circuit can be delayed. Therefore, the overall power supply period can be shortened to improve the battery saving effect.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A selective radio paging receiver comprising:
   local oscillation means for generating a local oscillation signal;
   frequency conversion means for mixing a radio paging signal and said local oscillation signal to convert said radio paging signal into a low frequency signal;
   wave shaper means for binary-coding said low frequency signal and thereby converting it into a digital signal;
   power supply timing signal generating means for regularly generating a power supply timing signal defining a battery saving period;
   battery saving means for terminating power supply at least for said local oscillation means, said frequency conversion means and said wave-shaper means during said battery saving period defined by said power supply timing signal, said battery saving means including:
   first power supply circuit responsive to occurrence of said power supply timing signal to supply a predetermined first voltage to said local oscillation means for a given period, wherein said first power supply circuit supplies the power of said first voltage to said local oscillation means after a predetermined time from the occurrence of said power supply timing signal; and
   second power supply circuit for supplying a power of a second voltage lower than said first voltage to said local oscillation means, frequency conversion means and wave shaper means for a period form expiration of said given period to termination of said power supply timing signal.

2. A selective radio paging receiver as set forth in claim 1, wherein the power supply period of said first power supply circuit and the power supply period of said second power supply circuit overlap partially.

3. A selective radio paging receiver as set forth in claim 2, which further comprises a battery, and said first power supply circuit includes booster means for generating said first voltage by elevating a voltage of said battery and switching means responsive to occurrence of said power supply timing signal for supplying the elevated voltage of said booster means to said local oscillation means for said given period after expiration of said predetermined period.

4. A selective radio paging receiver as set forth in claim 3, wherein said second power supply circuit includes a voltage stabilizing means for stabilizing the voltage of said battery and timer means for supplying the output voltage of said voltage stabilizing means to said local oscillation means for a period from expiration of said given period to termination of said power supply timing signal.

5. A selective radio paging receiver comprising:

radio reception portion for generating a low frequency signal by frequency mixing a radio paging signal and a local oscillation signal;

local oscillation portion for generating said local oscillation signal;

wave shaper circuit for generating a digital signal by binary-coding said low frequency signal;

paging notifying portion responsive to a paging notification signal for notifying paging;

decoder for regularly generating a power supply timing signal defining a battery saving period and generating said paging notification signal when a paging signal contained in said digital signal matches with own paging number;

battery saving means for interrupting power supply at least for said radio reception portion, said local oscillation portion and said wave shaper circuit during battery saving period, said battery saving means including;

first power supply circuit initiating supply of a power of a first voltage to said local oscillation portion after a first given period from initiation of reception of said power supply timing signal; and second power supply circuit supplying a power of a second voltage lower than said first voltage to said local oscillation portion radio reception portion and wave shaper circuit in place of said power of said first voltage after expiration of a second given period for initiation of power supply to said local oscillation portion.

6. A selective radio paging receiver as set forth in claim 5, wherein said first power supply circuit comprises a booster circuit for generating said first voltage from a battery voltage and a switching circuit responsive to said power supply timing signal to supply said first voltage from said booster circuit from initiation of reception of said power supply timing signal to a timing immediately after expiration of said second given period.

7. A selective radio paging receiver as set forth in claim 6, wherein said second power supply circuit comprises a timer for generating a power supply enabling signal after expiration of said second given period from initiation of reception of said power supply timing signal and a voltage regulator circuit receiving said power supply enabling signal to generate a second voltage from said battery voltage for stabilization during a period receiving said power supply enabling signal.

8. A selective radio paging receiver as set forth in claim 7, wherein said timer is provided in said decoder in place of said second power supply circuit.

9. A selective radio paging receiver comprising:

radio reception portion for generating a low frequency signal by frequency mixing a radio paging signal and a local oscillation signal;

local oscillation portion for generating said local oscillation signal;

wave shaper circuit or generating a digital signal by binary-coding said low frequency signal;

paging notifying portion responsive to a paging notification signal for notifying paging;

decoder regularly generating a power supply timing signal defining a battery saving period and generating said paging notification signal when a paging signal contained in said digital signal matches with own paging number;

booster circuit for generating a first voltage from a battery voltage;

voltage regulator circuit for generating a second voltage which is lower than said first voltage and stabilized;

first power control means responsive to said power supply timing signal for initiating supply of oscillation portion after a first given period from initiation of reception of said power supply timing signal; and second power control means responsive to said power supply timing signal for initiating supply of power from said voltage regulator circuit to said local oscillation portion, radio reception portion and wave shaper circuit in place of the power from said booster circuit after expiration of a second given period from initiation of power supply from said booster circuit.

10. A selective radio paging receiver comprising:

local oscillator for generating a local oscillation signal;

frequency converter for mixing a radio paging signal and said local oscillation signal to convert said radio paging signal into a low frequency signal;

wave shaper circuit for binary-coding said low frequency signal and thereby converting it into a digital signal;

power supply timing signal generator for regularly generating a power supply timing signal defining a battery saving period;

battery saving device for terminating power supply at least for said local oscillator, said frequency convertor and said wave-shaper circuit during said battery saving period defined by said power supply timing signal, said battery saving device including:

first power supply circuit responsive to occurrence of said power supply timing signal to supply a predetermined first voltage to said local oscillator for a given period; and second power supply circuit for supplying a power of a second voltage lower than said first voltage to said local oscillator, frequency conversion and wave shaper circuit for a period from expiration of said given period to termination of said power supply timing signal, wherein said first power supply circuit supplies the power of said first voltage to said local oscillator after a predetermined time form the occurrence of said power supply timing signal.

* * * * *